(12) United States Patent
Sato

(10) Patent No.: US 8,978,048 B2
(45) Date of Patent: Mar. 10, 2015

(54) INFORMATION PROCESSING SYSTEM, CONTROL METHOD, AND NON-TRANSITORY COMPUTER READABLE MEDIUM STORING PROGRAM

(75) Inventor: Tadashi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/514,444

(22) PCT Filed: Nov. 9, 2010

(86) PCT No.: PCT/JP2010/006557
§ 371 (c)(1),
(2), (4) Date: Jun. 7, 2012

(87) PCT Pub. No.: WO2011/070716
PCT Pub. Date: Jun. 16, 2011

(65) Prior Publication Data
US 2012/0254895 A1 Oct. 4, 2012

(30) Foreign Application Priority Data
Dec. 9, 2009 (JP) ................................. 2009-279210

(51) Int. Cl.
*G06F 9/44* (2006.01)
*G06F 9/46* (2006.01)
(Continued)

(52) U.S. Cl.
CPC ...................................... *G06F 9/542* (2013.01)
USPC ....................................................... 719/318

(58) Field of Classification Search
None
See application file for complete search history.

(56) References Cited

U.S. PATENT DOCUMENTS

| 6,477,585 | B1* | 11/2002 | Cohen et al. | 719/318 |
| 2005/0102353 | A1* | 5/2005 | Murphy et al. | 709/203 |
| 2006/0230077 | A1 | 10/2006 | Satou et al. | |
| 2008/0260161 | A1* | 10/2008 | Yokota et al. | 380/278 |

FOREIGN PATENT DOCUMENTS

| JP | 07-160616 A | 6/1995 |
| JP | 10-275125 A | 10/1998 |

(Continued)

OTHER PUBLICATIONS

Ashwin R. Bharambe et al., "Mercury: A Scalable Publish-Subscribe System for Internet Games", Proceedings of the 1st Workshop on Network and System Support for Games, (NetGames2002), Apr. 2002, pp. 1-7.

(Continued)

*Primary Examiner* — H S Sough
*Assistant Examiner* — William C Wood
(74) *Attorney, Agent, or Firm* — Sughrue Mion, PLLC

(57) ABSTRACT

An information processing system 5 according to the present invention includes a plurality of nodes each of which includes a key information generation unit 51 that generates first key information by converting an attribute name and an attribute value included in a received event information into a format that enables a magnitude comparison of the attribute name and the attribute value, a process target information storing unit 53 that stores key information of a predetermined attribute name and an attribute value within the predetermined range in advance, a target determination unit 52 that determines whether the event information should be handled as information to be processed or not by comparing the first key information with the second key information, and an information transfer unit 54 that transmits the event information that should not be handled as information to be processed and the first key information to another node.

10 Claims, 15 Drawing Sheets

(51) Int. Cl.
*G06F 13/00* (2006.01)
*G06F 3/00* (2006.01)
*G06F 9/54* (2006.01)

(56) References Cited

FOREIGN PATENT DOCUMENTS

| JP | 2003-167808 A | 6/2003 |
| JP | 2006-309701 A | 11/2006 |
| JP | 2008-097111 A | 4/2008 |

OTHER PUBLICATIONS

Ashwin R. Bharambe et al., "Mercury: Supporting Scalable Multi-Attribute Range Queries", ACM SIGCOMM Computer Communication Review, Oct. 2004, pp. 353-366; vol. 34, No. 4.

* cited by examiner

| ATTRIBUTE NAME | RANGE OF POSSIBLE ATTRIBUTE VALUE | SPECIFIED RANGE OF ATTRIBUTE VALUE | RATIO |
|---|---|---|---|
| x | INTEGER WITHIN [1, 100] | [11, 20] | 1/10 |
| y | INTEGER WITHIN [1, 300] | [11, 60] | 1/6 |

| SUBSCRIPTION ID | SUBSCRIPTION |
|---|---|
| "sub1" | (50≦x≦150&150≦y≦250, app1) |
| ⋮ | ⋮ |

Fig. 12

INFORMATION PROCESSING SYSTEM, CONTROL METHOD, AND NON-TRANSITORY COMPUTER READABLE MEDIUM STORING PROGRAM

CROSS REFERENCE TO RELATED APPLICATIONS

This application is a National Stage of International Application No. PCT/JP2010/006557 filed Nov. 9, 2010, claiming priority based on Japanese Patent Application No. 2009-279210 filed Dec. 9, 2009, the contents of all of which are incorporated herein by reference in their entirety.

TECHNICAL FIELD

The present invention relates to an information processing system, a control method, and a non-transitory computer readable medium storing a program.

BACKGROUND ART

There have been event distribution systems that can distribute data composed of a plurality of attributes such as an ID, a position, and a time (hereinafter referred to as "event") to applications. An event is composed of at least one attribute. An attribute is composed of an attribute name and an attribute value. For example, when an event is generated based on a temperature of 20° C. and a humidity of 60% measured by a temperature/humidity sensor, the event may be expresses as being composed of an attribute whose attribute name is "temperature" and whose attribute value is 20° C. and an attribute whose attribute name is "humidity" and whose attribute value is 60%.

A subscription ID, a request type, and a subscription are input (subscribed) from an external program (subscriber) to the event distribution system. The subscription ID is information used to identify the subscription. The request type is information used to determine whether it is a registration request or a deletion request. A subscription is composed of a condition of an event (event condition) and an ID of an application at the destination (application ID). In the case of the registration request, a pair of a subscription ID and a subscription is stored in the event distribution system.

When an event occurs, the occurring event is input (published) from an external program (publisher) to the event distribution system. When the event conforms to the event condition of a subscription in which the event is registered, the event distribution system transmits that event to an application identified by an application ID that is designated as being paired with the event condition.

A plurality of attribute conditions can be described as an event condition. An attribute name and a range of an attribute value for the attribute name can be specified as an attribute condition. When an event satisfies such a condition that, for each of all the attribute conditions constituting an event condition, the event includes an attribute name specified by the attribute condition and the range of an attribute value specified by the attribute condition covers an attribute value for the attribute name described in the event, then this means that the event conforms to the event condition. For example, assume that an event condition that an attribute name is "temperature" and the range of an attribute value for the attribute name is "no lower than 10° C. and no higher than 30° C." is registered in the event distribution system. In this state, assume also that an event including an attribute whose attribute name is "temperature" and whose attribute value is "20° C." and an attribute whose attribute name is "humidity" and whose attribute value is "60%" occurs. As for the attribute name "temperature" specified in the event condition, "20° C." is within the range "no lower than 10° C. and no higher than 30° C.". Therefore, this means that the event conforms to the event condition. As for the attribute name "humidity", it is not specified in the event condition. Therefore, it has no effect on whether the event conforms to the event condition or not.

Non-patent literature 1 discloses an example of a technique for processing an event like the one described above. FIG. 19 is a diagram for explaining the technique disclosed in Non-patent literature 1. Each of the event (publication in FIG. 19) and the event condition (subscription in FIG. 19) shown in FIG. 19 is composed of an attribute name x and an attribute name y. In the event, it is described that an attribute value for the attribute name x is 100 and an attribute value for the attribute name y is 200. In the event condition, it is described that the range of an attribute value for the attribute name x is "no less than 50 and no greater than 150" and the range of an attribute value for the attribute name y is "no less than 150 and no greater than 250". The event conforms to the event condition.

The system shown in FIG. 19 is composed of sub systems (hubs) that correspond to the respective attribute names in a one-to-one relation. A hub includes at least one node configured in a ring shape. When viewed from a given node, the next node on the ring is called "successor". Each node belonging to a hub manages the range of an attribute value (attribute value range) for an attribute name corresponding to the hub.

When a node receives a subscription from a subscriber or an event from a publisher, the node transfers the event or the subscription to a node that belongs to a different hub from the one to which the node belongs. Therefore, a node holds the network address of a node that belongs to a different hub from the one to which the node belongs (hereinafter, the node like this is called "cross-hub adjacent node"). Non-patent literature 2 discloses a method for determining a cross-hub adjacent node.

When a new node joins in a hub, the cross-hub adjacent node of the successor of that node is linked to the cross-hub adjacent node of that node. After that, a maintenance process is started. In the maintenance process, a new cross-hub adjacent node is determined by carrying out random walk in each of the other hubs. The random walk means a process in which: an access (hop) is performed from a node from which the random walk is started to an arbitrary node recoded in a routing table; a hop is further performed from the accessed node to another node through the same procedure described above; and the hop is repeated until the number of hops reaches a predetermined number. Further, a node that is accessed when the number of hops reaches the predetermined number is determined as a cross-hub adjacent node.

CITATION LIST

Non Patent Literature

Non-patent literature 1: Ashwin R. Bharambe, Sanjay Rao and Srinivasan Seshan: "Mercury: A Scalable Publish-Subscribe System for Internet Games", Proc. of 1st Workshop on Network and System Support for Games (NetGames2002), April 2002.

Non-patent literature 2: Ashwin R. Bharambe, Mukesh Agrawal, Srinivasan Seshan, "Mercury: Supporting Scalable Multi-attribute Range Queries," ACM SIGCOMM Computer Communication Review, Vol. 34 No. 4, October 2004.

SUMMARY OF INVENTION

Technical Problem

Incidentally, it is conceivable that when a system like the one shown in Non-patent literature 1 or 2 is constructed, all or part of the resources of an information processing device (calculation resources and memory resources) are allocated to each node. Further, it is also conceivable that in a system including hubs corresponding to respective attribute names like the one shown in Non-patent literature 1 or 2, when the load is concentrated on a certain node included in a certain hub, the range of an attribute value managed by each node included in that hub is adjusted. In this way, the load is distributed equally over the nodes and thereby is adjusted. Next, it is also conceivable that when the load on the nodes is not still sufficiently reduced, the load is adjusted by transferring resources allocated to other hubs to that certain hub. By equally distributing the load imposed on each node in this manner, it is possible to prevent such a situation that the load is concentrated to a certain node and that node becomes bottleneck, causing a deterioration in the event processing performance of the entire system.

However, when resources are transferred between nodes belonging to different hubs, there is a possibility that a new node needs to be constructed by using those resources. In such a case, there is a problem that it is necessary to assign successors and cross-hub adjacent nodes in addition to the adjustment the range of the attribute value managed by each node, making the process very troublesome.

There is a possibility that a resource allocated to a certain node from a hub different from the one to which the certain node belongs is a resource allocated on an information processing device different from the one on which the node is operating at that point. In such a case, since a node cannot operate on a plurality of information processing devices at the same time, it is necessary to construct a new node.

Further, in the technique disclosed in Non-patent literature 2, each node needs to perform random walk in each hub in order to determine a cross-hub adjacent node. Therefore, there is a problem that it causes an additional processing cost to perform the random walk increases. This leads to increase in the load imposed on nodes included in each hub.

As explained above, in a system including hubs corresponding to respective attribute names, there is a problem that adjusting the load imposed on each node becomes very troublesome.

An object of the present invention is to provide an information processing system, a control method, and a program, capable of facilitating the adjustment of a load imposed on each node in order to solve the above-described problem.

Solution to Problem

An information processing system according to a first aspect of the present invention is an information processing system including a plurality of first nodes each of which receives event information including an attribute name indicating arbitrary information and an attribute value indicating a value of the arbitrary information, and processes event information including a predetermined attribute name and an attribute value within a predetermined range, wherein the first node includes: a key information generation unit that, when the event information is received, generates first key information by converting an attribute name and an attribute value included in the event information into a format that enables a magnitude comparison of the attribute name and the attribute value; a process target information storing unit that stores process target information indicating second key information of the predetermined attribute name and the attribute value within the predetermined range in advance; a process target determination unit that, when the event information is received, determines whether the event information should be handled as information to be processed or not by comparing the first key information generated from the event information with the process target information; and an information transfer unit that, when the process target determination unit determines that the event information should not be handled as information to be processed, transmits the event information, or the event information and the first key information generated from the event information to another first node.

A control method according to a second aspect of the present invention is a control method of a node that receives event information including an attribute name indicating arbitrary information and an attribute value indicating a value of the arbitrary information, and processes event information including a predetermined attribute name and an attribute value within a predetermined range, the control method including: a step of, when the event information is received, generating first key information by converting an attribute name and an attribute value included in the event information into a format that enables a magnitude comparison of the attribute name and the attribute value; a step of, when the event information is received, determining whether the event information should be handled as information to be processed or not by comparing the first key information generated from the event information with pre-stored process target information, the pre-stored process target information indicating second key information of the predetermined attribute name and the attribute value within the predetermined range in advance; and a step of, when it is determined that the event information should not be handled as information to be processed, transmitting the event information, or the event information and the first key information generated from the event information to another node.

A program according to a third aspect of the present invention is a program for controlling a node that receives event information including an attribute name indicating arbitrary information and an attribute value indicating a value of the arbitrary information, and processes event information including a predetermined attribute name and an attribute value within a predetermined range, the program causing a computer to execute: a step of, when the event information is received, generating first key information by converting an attribute name and an attribute value included in the event information into a format that enables a magnitude comparison of the attribute name and the attribute value; a step of, when the event information is received, determining whether the event information should be handled as information to be processed or not by comparing the first key information generated from the event information with pre-stored process target information, the pre-stored process target information indicating second key information of the predetermined attribute name and the attribute value within the predetermined range in advance; and a step of, when it is determined that the event information should not be handled as information to be processed, transmitting the event information, or the event information and the first key information generated from the event information to another node.

Advantageous Effects of Invention

According to the above-described present invention, it is possible to provide an information processing system, a control method, and a program, capable of facilitating the adjustment of a load imposed on each node.

BRIEF DESCRIPTION OF DRAWINGS

FIG. 12 shows an example of a subscription management table according to an exemplary embodiment of the present invention;

DESCRIPTION OF EMBODIMENTS

Figure 1:
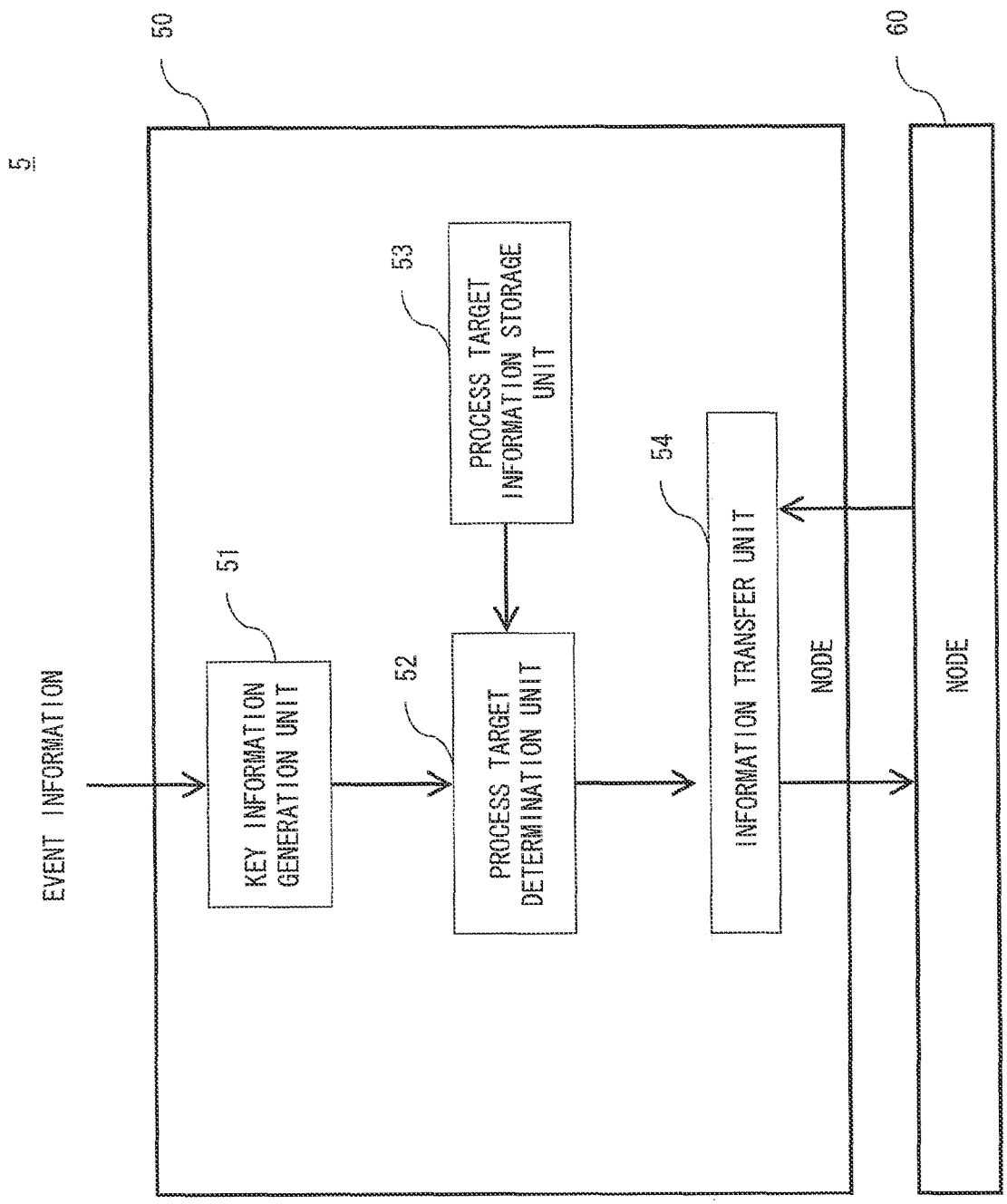
FIG. 1 is a configuration diagram of an information processing system according to an exemplary embodiment of the present invention.

Exemplary embodiment according to the present invention Firstly, an outline of an event distribution system according to an exemplary embodiment of the present invention is explained with reference to FIG. 1. FIG. 1 is a configuration diagram of an information processing system, which is an outline configuration of an event distribution system according to an exemplary embodiment of the present invention.

An information processing system 5 includes a plurality of nodes 50 and 60. The node 50 includes a key information generation unit 51, a process target determination unit 52, a process target information storage unit 53, and an information transfer unit 54. As for the configuration of the node 60, since it is similar to the configuration of the node 50, its explanation is omitted.

Each of the nodes 50 and 60 receives event information including an attribute name and an attribute value. The attribute name indicates arbitrary information. The attribute value indicates a value of this arbitrary information. Each of the nodes 50 and 60 handles, among the received event information, event information including a predetermined attribute name and an attribute value within a predetermined range as information to be processed.

When event information is received, the key information generation unit 51 generates first key information by converting an attribute name and an attribute value contained in this event information into a format that enables a magnitude comparison of the attribute name and the attribute value.

When event information is received, the process target determination unit 52 compares the first key information generated from this event information with process target information stored in the process target information storage unit 53. In this way, the process target determination unit 52 determines whether this event information should be handled as information to be processed or not.

The process target information storage unit 53 holds process target information in advance. The process target information indicates second key information of a predetermined attribute name and an attribute value within a predetermined range.

When the process target determination unit 52 determines that the event information is not handled as information to be processed, the information transfer unit 54 transmits this event information and the first key information generated from this event information to other nodes.

Next, a process performed by the information processing system according to an exemplary embodiment of the present invention is explained.

Firstly, when event information is received, the key information generation unit 51 generates first key information by converting an attribute name and an attribute value contained in this event information into a format that enables a magnitude comparison of the attribute name and the attribute value. Then, the key information generation unit 51 outputs the event information and the first key information generated from the event information to the process target determination unit 52.

Upon obtaining the event information and the first key information output from the key information generation unit 51, the process target determination unit 52 obtains process target information stored in the process target information storage unit 53. Then, the process target determination unit 52 determines whether the obtained event information should be handled as information to be processed or not by comparing the obtained first key information with the process target information.

When the process target determination unit 52 determines that the event information should not be handled as information to be processed, the information transfer unit 54 transmits the first key information generated from this event information as well as the event information itself to other nodes.

Figure 2:
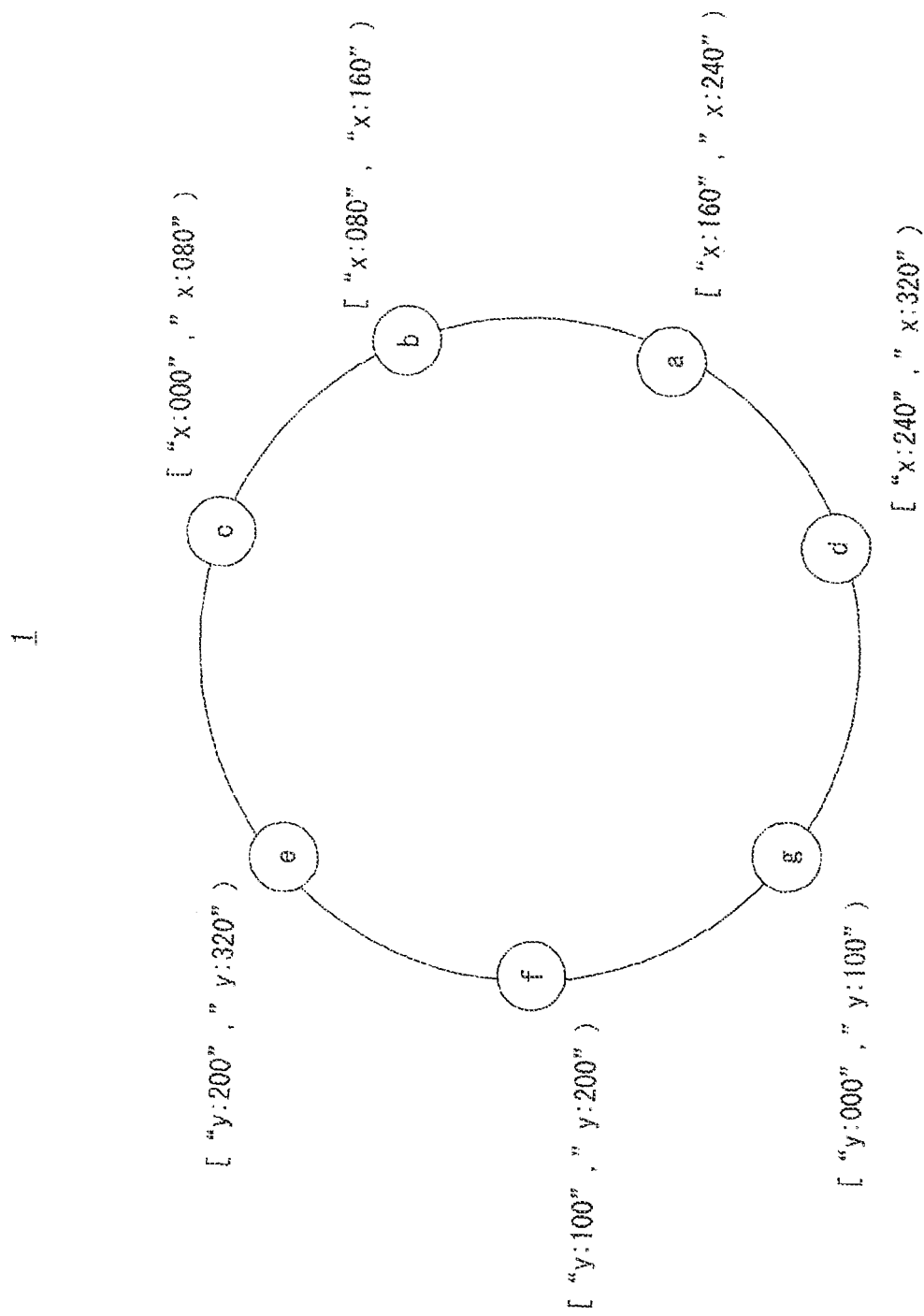
FIG. 2 is a configuration diagram of an event distribution system according to an exemplary embodiment of the present invention.

Next, the event distribution system according to an exemplary embodiment of the present invention is explained in detail. A configuration of the event distribution system according to this exemplary embodiment is explained with reference to FIG. 2. FIG. 2 shows a configuration diagram of the event distribution system.

The event distribution system 1 includes at least one node. In the event distribution system, a finite value (key) space is managed. An order is defined among different keys. Each node manages a successive range of a key.

In this exemplary embodiment, a key generating function of generating a key by converting an attribute name and an attribute value contained in an event and a subscription into a format that enables a magnitude comparison of the attribute name and the attribute value is prepared. That is, the key generating function is a function that returns a key as a return value. Letting "n" and "y" stand for an attribute name and an attribute value respectively, a key generating function of generating a key is expressed as "f(n,v)". Note that "n" is a character string and "v" is an arbitrary real number. Assume that an order is defined for each of the attribute name and the attribute value. That is, a magnitude relation is defined for the attribute name. For example, when the attribute name is expressed by a character sting and an order is assigned according to the dictionary order, an attribute name "temperature" has a value smaller than that of an attribute name "time". The function f(n,v) is such a function that if n1>n2, then f(n1, v1)>f(n2, v2) is satisfied. Note that "v1" and "v2" are arbitrary values. Further, the function f(n,v) is such a function that if n1=n2 and v1>v2,then f(n1, v1)>f(n2, v2) is satisfied.

An example of the key generating function is shown. A key generating function shown below is expressed as "f1(n,v)". Assume that an attribute name is expressed by a character string. Assume also that an attribute value is expressed by a three-digit decimal integer (from 0 to 999). Firstly, the function f1(n,v) converts an attribute value into a character string. When the attribute value is a value from 0 to 99, the function f1(n,v) adds "0" as the highest-digit value to express the attribute value by three characters. For example, a value 20 is converted into a character string "020". After that, the function f1(n,v) connects the character string of the attribute name with the character string of the attribute value with a delimiter interposed therebetween. The function f1(n,v) returns the connected character string as the return value of the function f1(n,v). As for the delimiter, a symbol that is used for neither the attribute name nor the attribute value is used. For example, when ":" is used as the delimiter, it is expressed as f1("x", 20)="x:020".

Another example of the key generating function is shown. A key generating function shown below is expressed as "f2 (n,v)". A character string obtained by the function f1(n,v) is expressed as a bit string by using character code in an information processing device such as a PC (Personal Computer) and a server. The function f2(n,v) returns a predetermined number of highest bits of the bit string that is obtained by expressing the character string obtained by the function f1(n, v) by using character code as the return value. For example, the function f2 returns highest 160 bits of the bit string as the return value. When the character code is expressed by four bytes, "x:020" has 160 bits (4 bytes×5 characters×8). Therefore, the return value is the entire bit string obtained by expressing "x:020" by using character code.

In this exemplary embodiment, an example in which the event distribution system 1 includes seven nodes, i.e., nodes a to g is shown. Assume that the event distribution system 1 supports two attribute names including an attribute name "x" for which the range of possible attribute value is an integer no less than 0 and less than 320 and an attribute name "y" for which the range of possible attribute value is an integer no less than 0 and less than 320. That is, each of the attribute values has the minimum value and the maximum value. An example in which the order of characters is expressed as ":"<"0"<"1" < . . . <"9"<"a"<"b"< . . . <"z" is shown. For example, the node a manages a character string that is equal to or greater than "x:160" and smaller than "x:240". For example, a key "x:200" is managed by the node a.

Note that each of the nodes a to g is composed of an information processing device or part of an information processing device. That is, one node may be composed of one information processing device. Alternatively, one node may be constructed by allocating an appropriate amount of resources of a memory, a CPU (Central Processing Unit), a hard disk drive, and the like included in an information processing device. That is, a plurality of nodes may be constructed from one information processing device.

Figure 3:
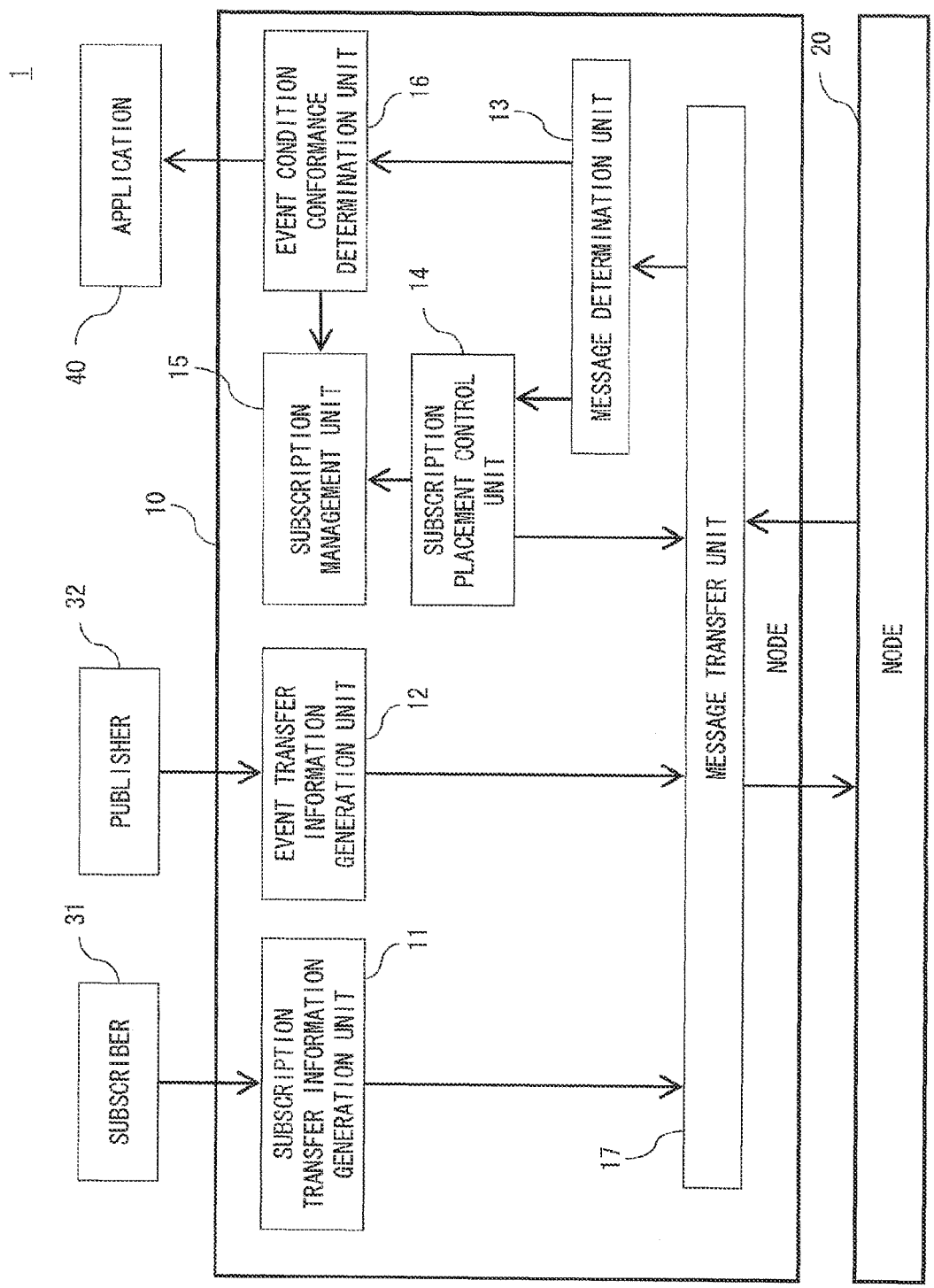
FIG. 3 is a configuration diagram of a node according to an exemplary embodiment of the present invention.

Next, a configuration of a node according to this exemplary embodiment is explained. FIG. 3 shows a configuration diagram of a node.

A node 10 includes a subscription transfer information generation unit 11, an event transfer information generation unit 12, a message determination unit 13, a subscription placement control unit 14, a subscription management unit 15, an event condition conformance determination unit 16, and a message transfer unit 17. Note that the configuration of the node 20 is similar to the configuration of the node 10, and therefore its explanation is omitted. That is, each of the nodes a to g included in the event distribution system 1 has a similar configuration to that of the node 10.

The subscription transfer information generation unit 11 generates information necessary to transfer a subscription supplied from a subscriber 31, from that subscription.

The event transfer information generation unit 12 generates information necessary to transfer an event supplied from a publisher 32, from that event. The information generated by each of the subscription transfer information generation unit 11 and the event transfer information generation unit 12 contains a key. Each of the subscription transfer information generation unit 11 and the event transfer information generation unit 12 functions as the key information generation unit 51.

The message determination unit 13 determines whether a message sent to the node 10 is a subscription or an event.

The subscription placement control unit 14 performs control to determine in which node a subscription should be placed. The subscription management unit 15 stores a subscription within the node.

The subscription management unit 15 corresponds to the event condition information storage unit.

The event condition conformance determination unit 16 determines whether a received event conforms to an event condition or not.

The message transfer unit 17 transfers a message containing an event and/or a message containing a subscription ID, a subscription, and a request type to a node determined based on a received key. The message transfer unit 17 functions as the process target determination unit 52 and the information transfer unit 54.

Figure 4:
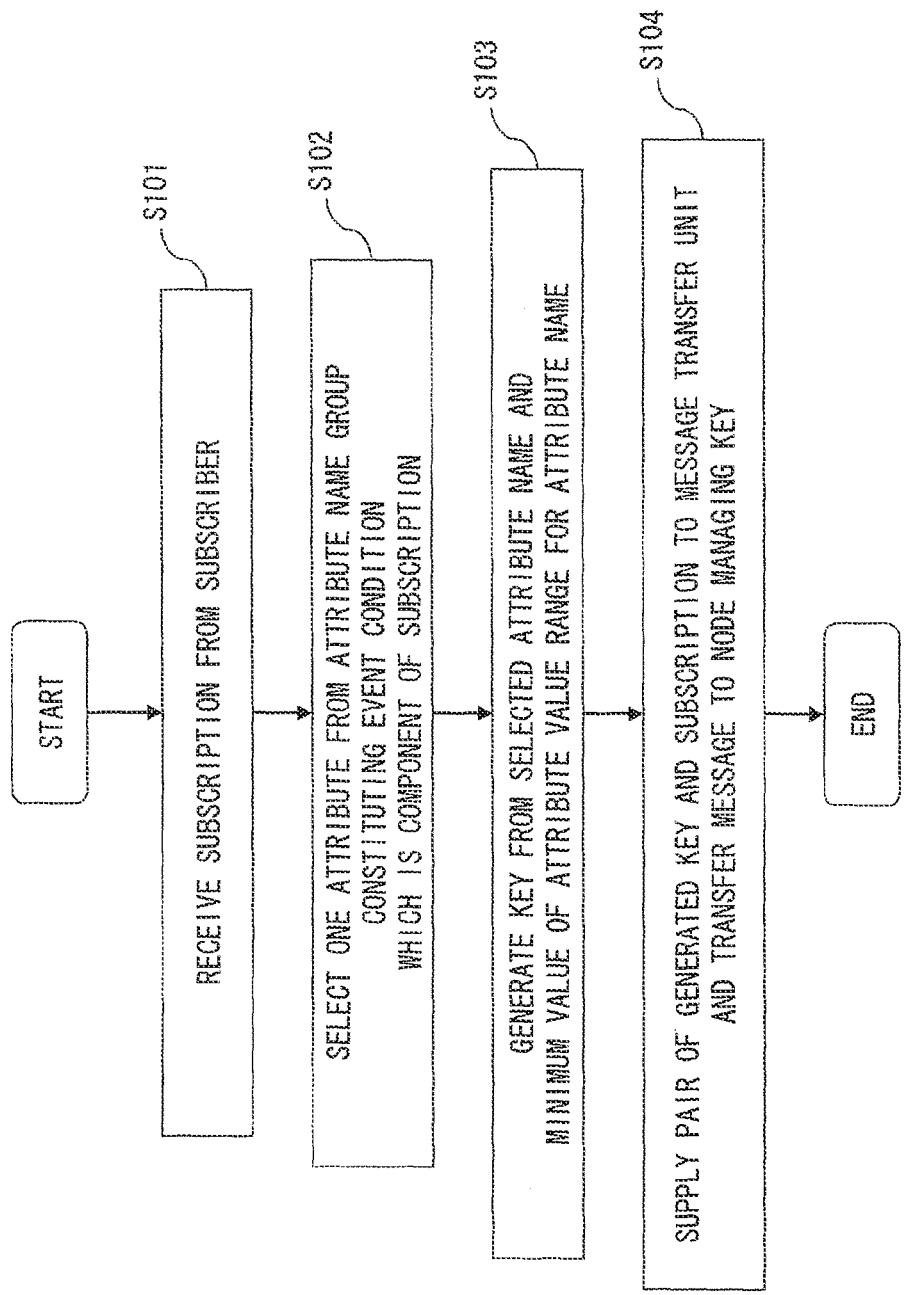
FIG. 4 is a flowchart showing an operation in a subscription transfer information generation unit according to an exemplary embodiment of the present invention.

Next, an operation in the subscription transfer information generation unit 11 according to this exemplary embodiment is explained with reference to FIG. 4. FIG. 4 is a flowchart showing an operation in the subscription transfer information generation unit 11.

When a subscription is input from the subscriber 31 to the node 10, the input subscription is first processed by the subscription transfer information generation unit 11 (S101). The subscription transfer information generation unit 11 selects one attribute from a group of attribute names that constitutes an event condition which is a component of the received subscription (S102). Next, the subscription transfer information generation unit 11 generates a key from the selected attribute name and the minimum value of the range of its attribute value. Finally, the subscription transfer information generation unit 11 pairs the generated key with the subscription and supplies the pair of the generated key and the subscription to the message transfer unit 17. In this way, a message containing the subscription is transferred to a node that manages its key.

Figures 5, 6:
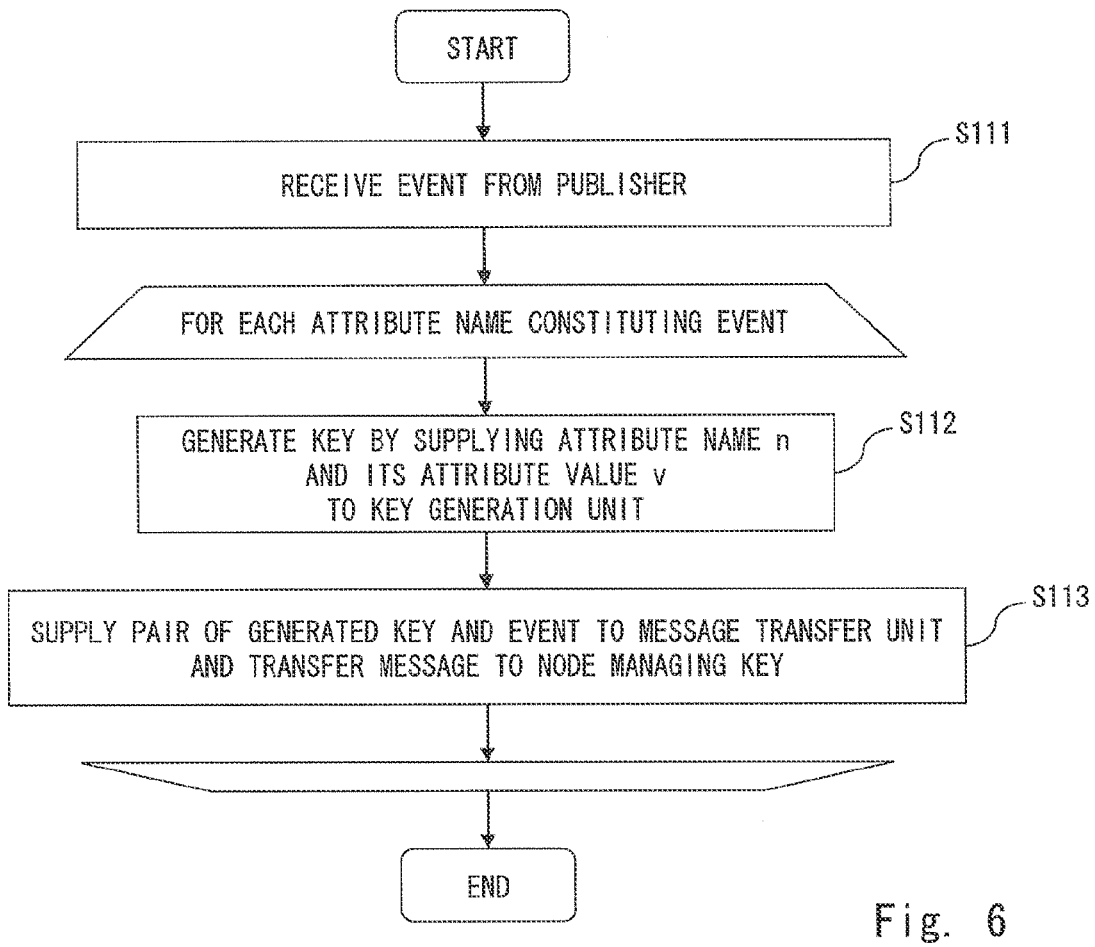
FIG. 5 shows an example of a relation among a range from a minimum value to a maximum value that an attribute value according to an exemplary embodiment of the present invention can take, a range of an attribute value specified in an event condition, and a ratio of the range of the attribute value to the range from the minimum value to the maximum value.
FIG. 6 is a flowchart showing an operation in an event transfer information generation unit according to an exemplary embodiment of the present invention.

As an example method for selecting one attribute from a group of attribute names constituting an event condition, there is a method in which: for each of the attribute names constituting the event condition, a ratio of the attribute value range designated as an event condition to the range of the possible values the attribute value can take is obtained; and an attribute name having the lowest ratio is selected. FIG. 5 shows an example of a relation among a range from a minimum value to a maximum value the attribute value can take, a range of the attribute value specified in the event condition, and a ratio of the range of the attribute value to the range from the minimum value to the maximum value. Assuming that the number of values that the attribute value of the attribute name "x" can take is 100 and the size of the attribute value range specified in the event condition is 10, the ratio becomes 1/10. Assuming that the number of values that the attribute value of the attribute name "y" can take is 300 and the size of the attribute value range specified in the event condition is 50, the ratio becomes 1/6. Therefore, the attribute name "x" having a lower ratio is selected in this example. Then, a key is generated from the attribute name "x" and the minimum value of the attribute value range corresponding to the attribute name "x", i.e., the attribute value "11". To generate a key from an attribute name and an attribute value, the above-described key generating function is used.

Note that when the range of an attribute value of an attribute selected from a group of attribute names included in the event condition of a subscription and the range of an attribute value managed by a node overlap with each other, the subscription is registered in that node. Therefore, by selecting an attribute name having the lowest ratio, the number of nodes in which the subscription is registered can be reduced.

Next, an operation in the event transfer information generation unit 12 according to this exemplary embodiment is explained with reference to FIG. 6. FIG. 6 is a flowchart showing an operation of the event transfer information generation unit 12.

An event input from the publisher 32 is first processed by the event transfer information generation unit 12 (S111). The event transfer information generation unit 12 performs the following process for each attribute name constituting the received event. Firstly, the event transfer information generation unit 12 generates a key by supplying an attribute name n and an attribute value v for the attribute name n to a key generating function (S112). Next, the event transfer information generation unit 12 supplies the pair of the generated key and the event to the message transfer unit 17, and thereby transfers a message to a node that manages the key (S113).

Figure 7:
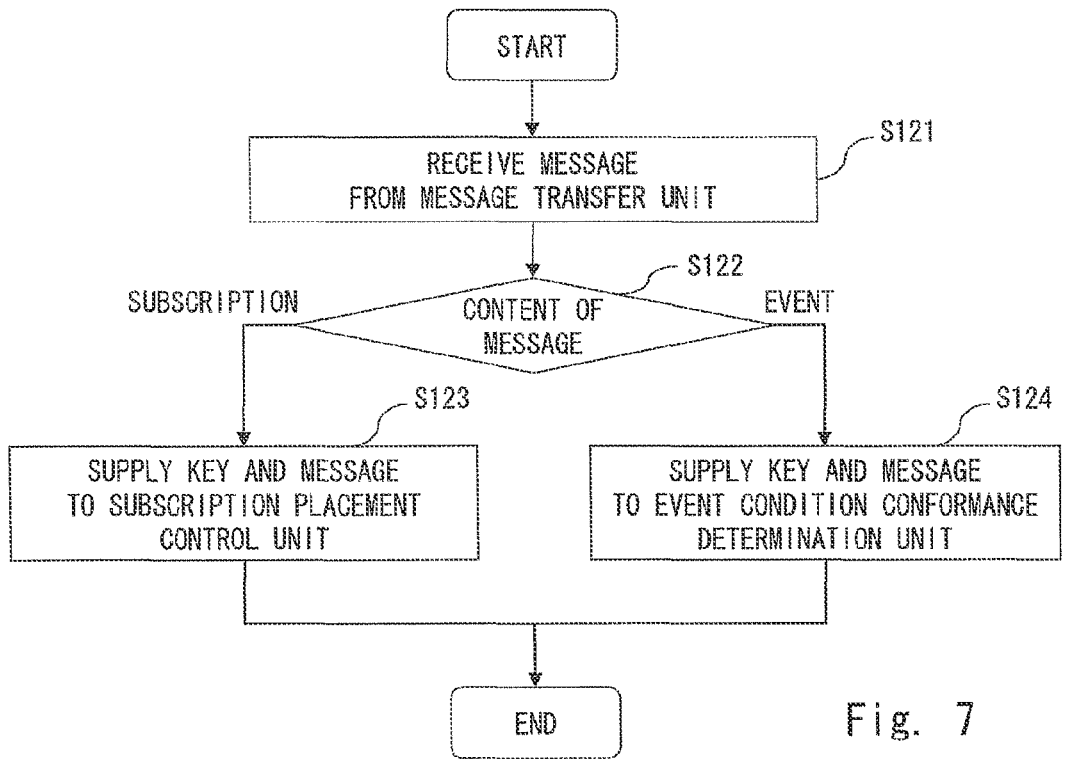
FIG. 7 is a flowchart showing an operation in a message determination unit according to an exemplary embodiment of the present invention.

Next, an operation in the message determination unit 13 according to this exemplary embodiment is explained with reference to FIG. 7. FIG. 7 is a flowchart showing an operation of the message determination unit 13.

The message determination unit 13 receives a key and a message from the message transfer unit 17 (S121). The message determination unit 13 examines the content of the received message (S122). When the message is a subscription, the message determination unit 13 supplies the key and the message to the subscription placement control unit 14 and finishes the process (S123). On the other hand, when the message is an event, the message determination unit 13 supplies the key and the event to the event condition conformance determination unit 16 and finishes the process (S124).

Figure 8:
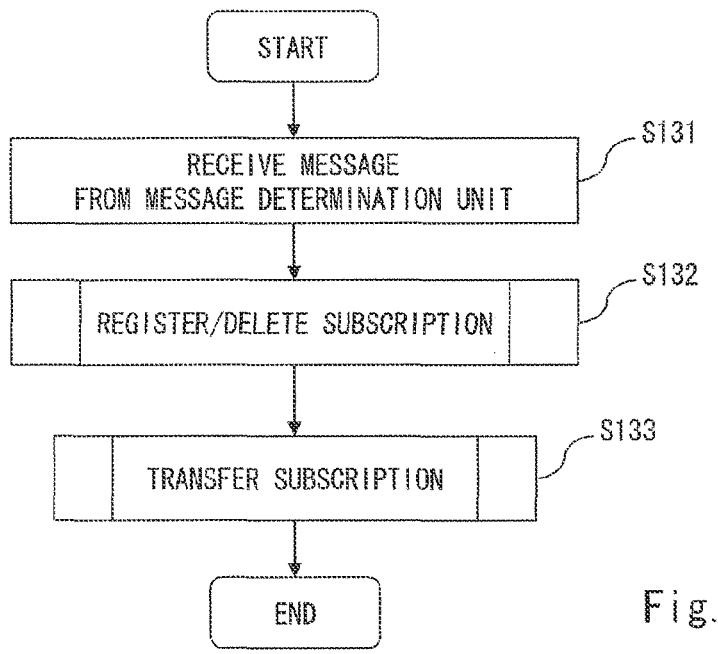
FIG. 8 is a flowchart showing an operation in a subscription placement control unit according to an exemplary embodiment of the present invention.

Next, an operation in the subscription placement control unit 14 according to this exemplary embodiment is explained with reference to FIGS. 8 to 10. FIG. 7 is a flowchart showing an operation of the subscription placement control unit 14.

The subscription placement control unit 14 receives a key and a message from the message determination unit 13 (S131). After that, the subscription placement control unit 14 performs a subscription registration/deletion process (S132) and a subscription transfer process (S133). These two processes are explained hereinafter.

Figure 9:
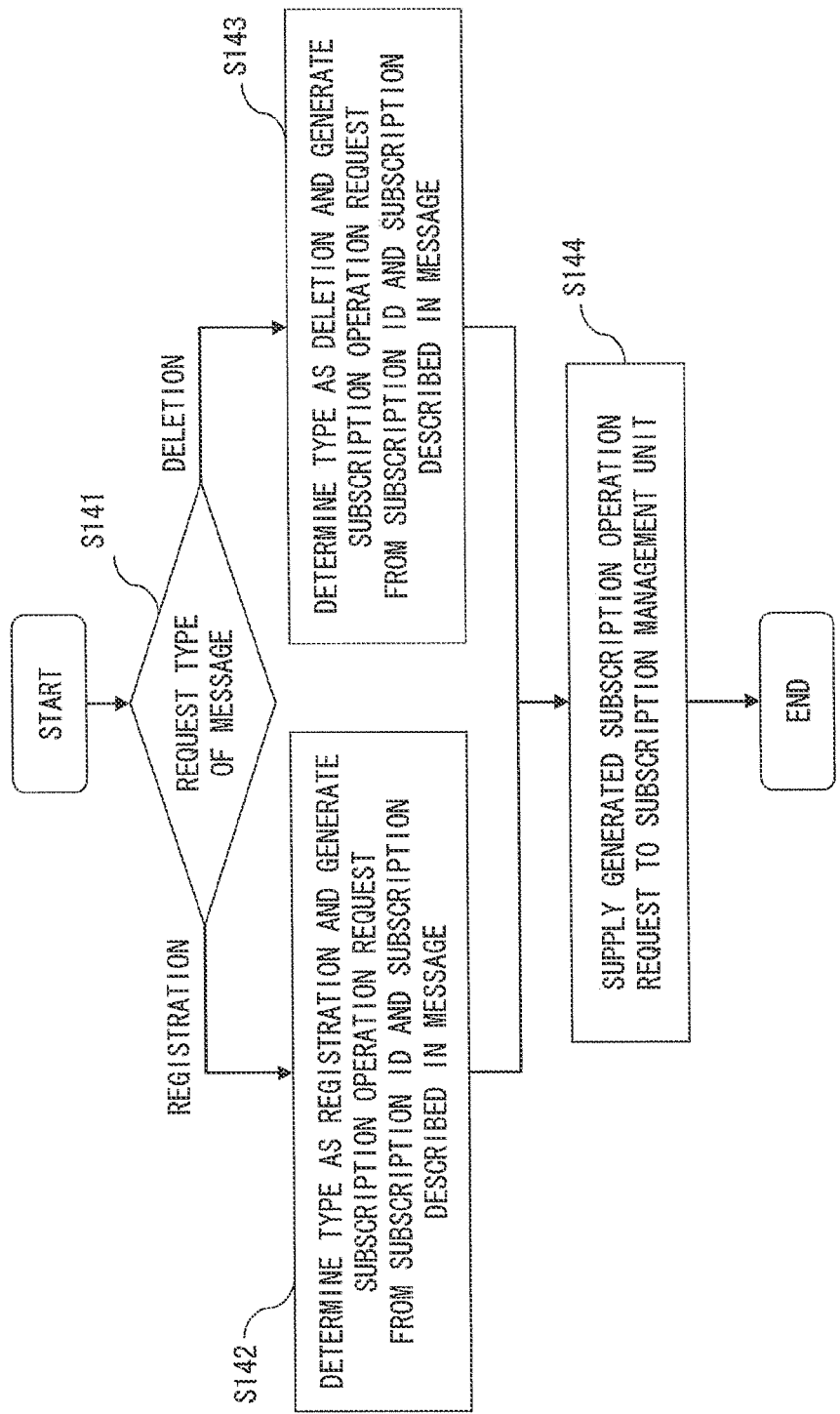
FIG. 9 is a flowchart of a subscription registration/deletion process according to an exemplary embodiment of the present invention.

FIG. 9 is a flowchart showing the subscription registration/deletion process. In the subscription registration/deletion process, the subscription placement control unit 14 first examines the request type of the message (S141). When the message is a registration request, the subscription placement control unit 14 determines the type as "registration" and generates a subscription operation request from a subscription ID and a subscription contained in the message (S142). The subscription placement control unit 14 supplies the generated subscription operation request to the subscription management unit 15 (S144). On the other hand, when the message is a deletion request, the subscription placement control unit 14 determines the type as "deletion" and generates a subscription operation request from a subscription ID and a subscription contained in the message (S143). The subscription placement control unit 14 supplies the generated subscription operation request to the subscription management unit 15 (S144).

Figure 10:
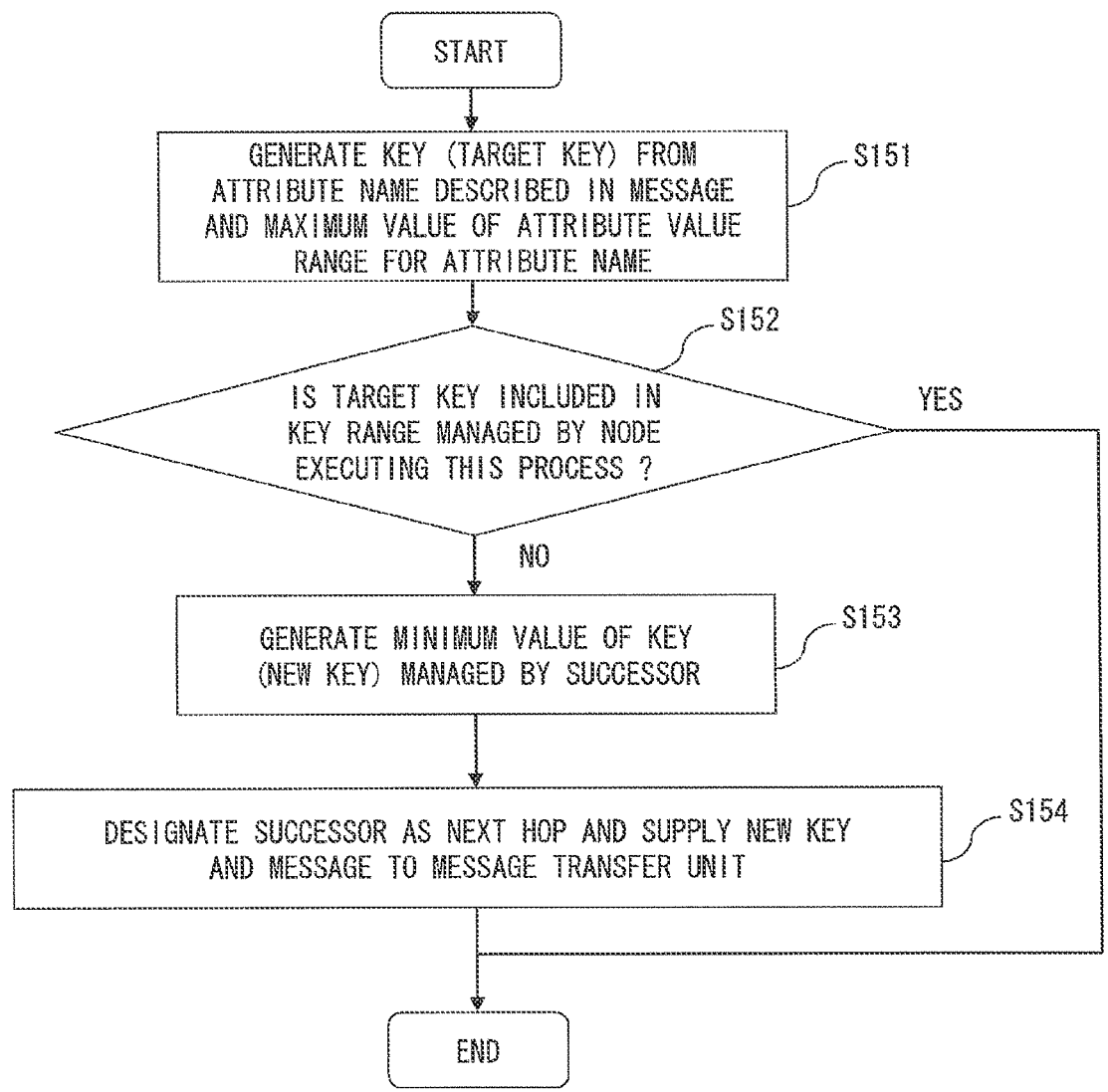
FIG. 10 is a flowchart of a subscription transfer process according to an exemplary embodiment of the present invention.

FIG. 10 is a flowchart showing the subscription transfer process. In the subscription transfer process, the subscription placement control unit 14 first generates a key (target key) from an attribute name contained in a message and the maximum value of the range of an attribute value for the attribute name (S151). Next, the subscription placement control unit 14 determines whether or not the target key is within a key range managed by the node that is executing this process (S152). When the target key is not within the key range, the subscription placement control unit 14 generates a minimum value of a key managed by the successor (i.e., generates a new key) (S153). After that, the subscription placement control unit 14 designates the successor as the next hop and supplies the new key and the message to the message transfer unit 17 (S154).

Figure 11:
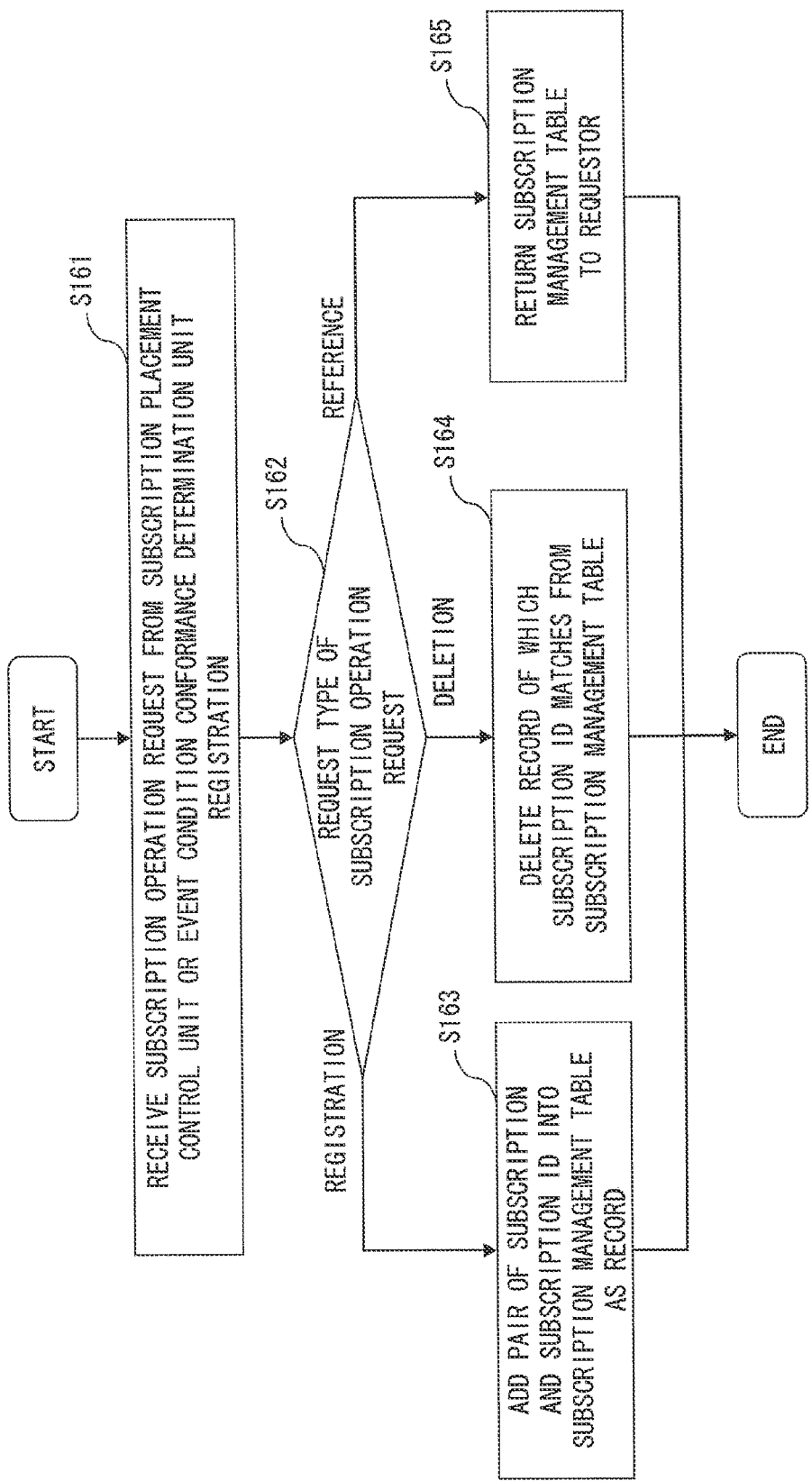
FIG. 11 is a flowchart showing an operation in a subscription management unit according to an exemplary embodiment of the present invention.

Next, an operation in the subscription management unit 15 according to this exemplary embodiment is explained with reference to FIG. 11. FIG. 11 is a flowchart showing an operation of the subscription management unit 15.

The subscription management unit 15 has a subscription management table that is used to manage subscription IDs and subscriptions. FIG. 12 shows an example of the subscription management table. In the subscription management table, records, in each of which a subscription ID is associated with a subscription, are stored.

The subscription management unit 15 receives a subscription operation request from the subscription placement control unit 14 or the event condition conformance determination unit 16 (S161).

Figure 13:
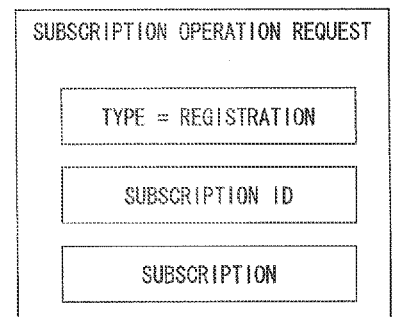
FIG. 13 shows a subscription operation request performed when a type is registration.
Figure 14:
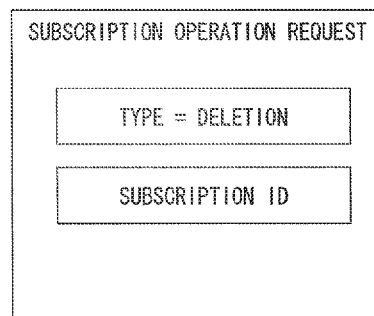
FIG. 14 shows a subscription operation request performed when a type is deletion.
Figure 15:
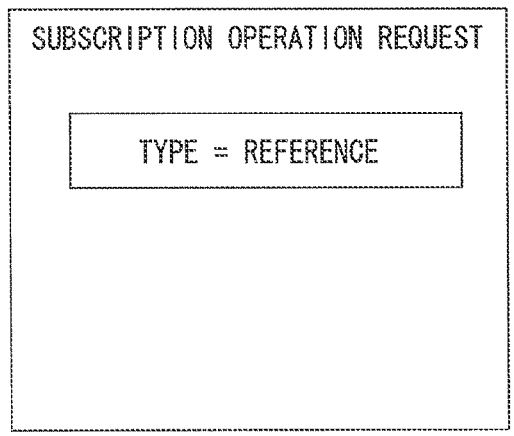
FIG. 15 shows a subscription operation request performed when a type is reference.

The subscription operation request includes a type as one of its components. The type includes "registration", "deletion", and "reference". The components of the subscription operation request are different depending on the type. FIG. 13 shows an example of subscription operation request in the case where the type is "registration". When the type is "registration", the subscription operation request includes a subscription ID and a subscription as well as the type. FIG. 14 shows an example of subscription operation request in the case where the type is "deletion". When the type is "deletion", the subscription operation request includes a subscription ID as well as the type. FIG. 15 shows an example of subscription operation request in the case where the type is "reference". When the type is "reference", the subscription operation request includes only the type.

When a subscription operation request is received, the subscription management unit 15 first refers to the type of the received subscription operation request (S162). When the type is "registration", the subscription management unit 15 adds a pair of a subscription and a subscription ID in the subscription management table as a new record (S163). When the type is "deletion", the subscription management unit 15 deletes a record of which the subscription ID matches from the subscription management table (S164). When the type is "reference", the subscription management unit 15 returns the subscription management table to the requestor (S165).

Figure 16:
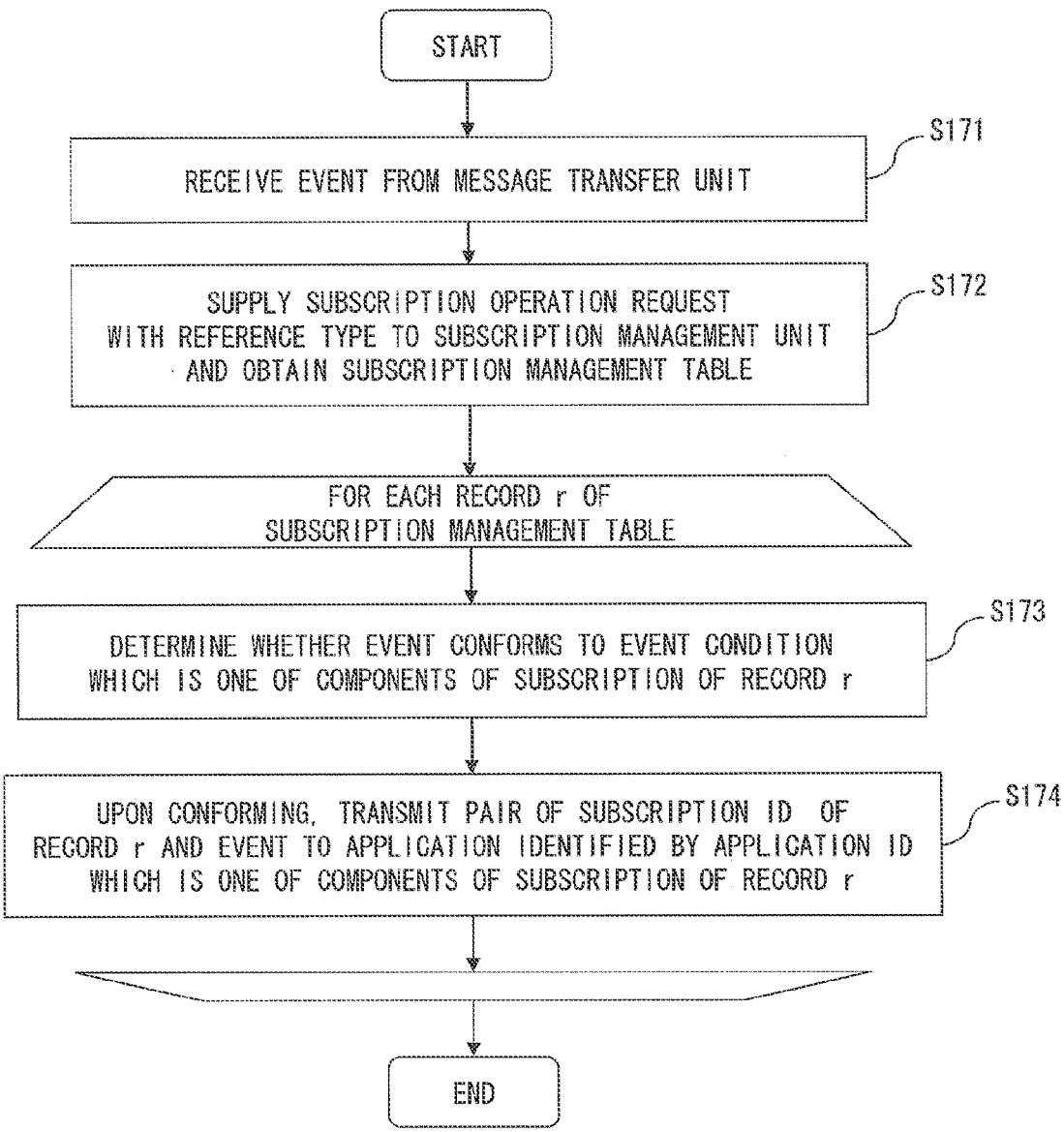
FIG. 16 is a flowchart showing an operation in an event condition conformance determination unit according to an exemplary embodiment of the present invention.

Next, an operation in the event condition conformance determination unit 16 according to this exemplary embodiment is explained with reference to FIG. 16. FIG. 16 is a flowchart showing an operation of the event condition conformance determination unit 16.

When the event condition conformance determination unit 16 receives an event from the message transfer unit 17 (S171), the event condition conformance determination unit 16 obtains a subscription management table from the subscription management unit 15 by issuing a subscription operation request whose type is "reference" to the subscription management unit 15 (S172). The event condition conformance determination unit 16 performs the following process for each record r of the obtained subscription management table. Firstly, the event condition conformance determination unit 16 determines whether or not the event conforms to an event condition which is one of the components of the subscription of the record r (S173). When the event conforms to the event condition, the event condition conformance determination unit 16 transmits a pair of the subscription ID of the record r and the event to an application 40 identified by an application ID that is one of the components of the subscription of the record r (S174).

Figure 17:
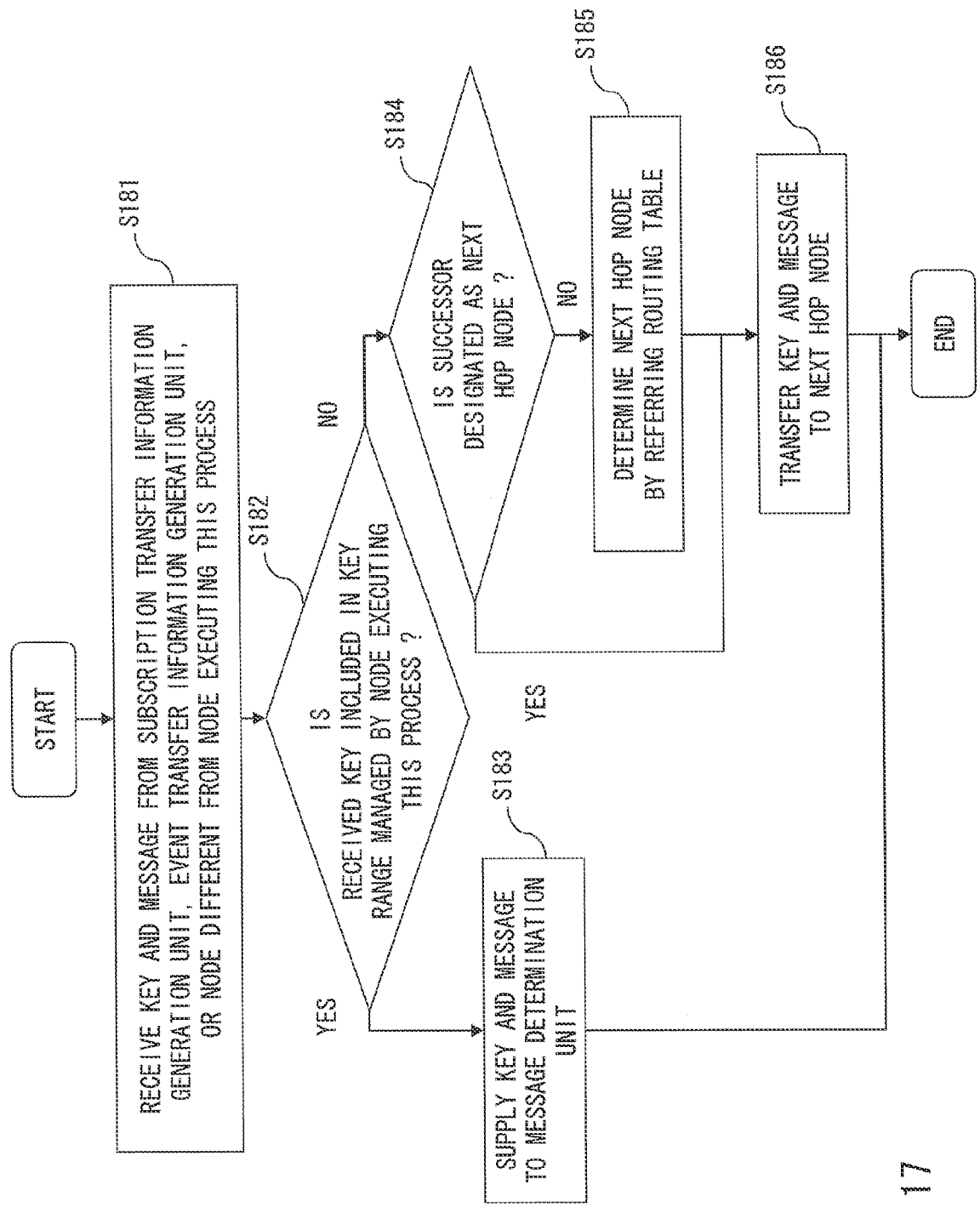
FIG. 17 is a flowchart showing an operation in a message transfer unit according to an exemplary embodiment of the present invention.

Next, an operation in the message transfer unit 17 according to this exemplary embodiment is explained with reference to FIG. 17. FIG. 17 is a flowchart showing an operation of the message transfer unit 17.

The message transfer unit 17 receives a key and a message from the subscription transfer information generation unit 11, the event transfer information generation unit 12, the subscription placement control unit 14, or a node different from the one executing this process (S181). Upon receiving the key and the message, the message transfer unit 17 determines whether or not the received key is within a key range managed by the node executing this process (S182). For example, the node 10 including the message transfer unit 17 may be equipped with an arbitrary storage device such as a memory and a hard disk drive. Further, key range information indicating the key range managed by the node 10 may be stored in this storage device. Further, the node 10 may be configured so that the message transfer unit 17 can make the decision in this process by comparing the received key with the key range information. This storage device corresponds to the process target information storage unit 53.

When the key is within the key range, the message transfer unit 17 supplies the key and the message to the message determination unit 13 (S183). When the key is not within the key range, the message transfer unit 17 determines whether or not the successor is designated as the next hop node (S184). When the successor is not designated as the next hop node, the message transfer unit 17 determines the transfer-destination node by referring to a routing table (S185). Then, the message transfer unit 17 transfers the key and the message to the next hop node (S186).

In the routing table, pairs of keys and network addresses are managed. The message transfer unit 17 has a routing table. The routing table is stored, for example, in an arbitrary storage device of the message transfer unit 17. The routing table generation method, the routing table maintenance method, and the method for determining the node to which the message is to be transferred by referring a routing table depend on the routing protocol. Examples of the routing protocol that can be used for the present invention include a method disclosed in Section 3.3 of Non-patent literature 2. The routing protocol may be arbitrarily determined. For example, the routing protocol may be determined such that the key and the message are delivered to a node for which "(transmitted key)−(minimum value of key range managed by node)" is the lowest among nodes for which "(transmitted key)>(minimum value of key range managed by node)" is satisfied.

Figure 18:
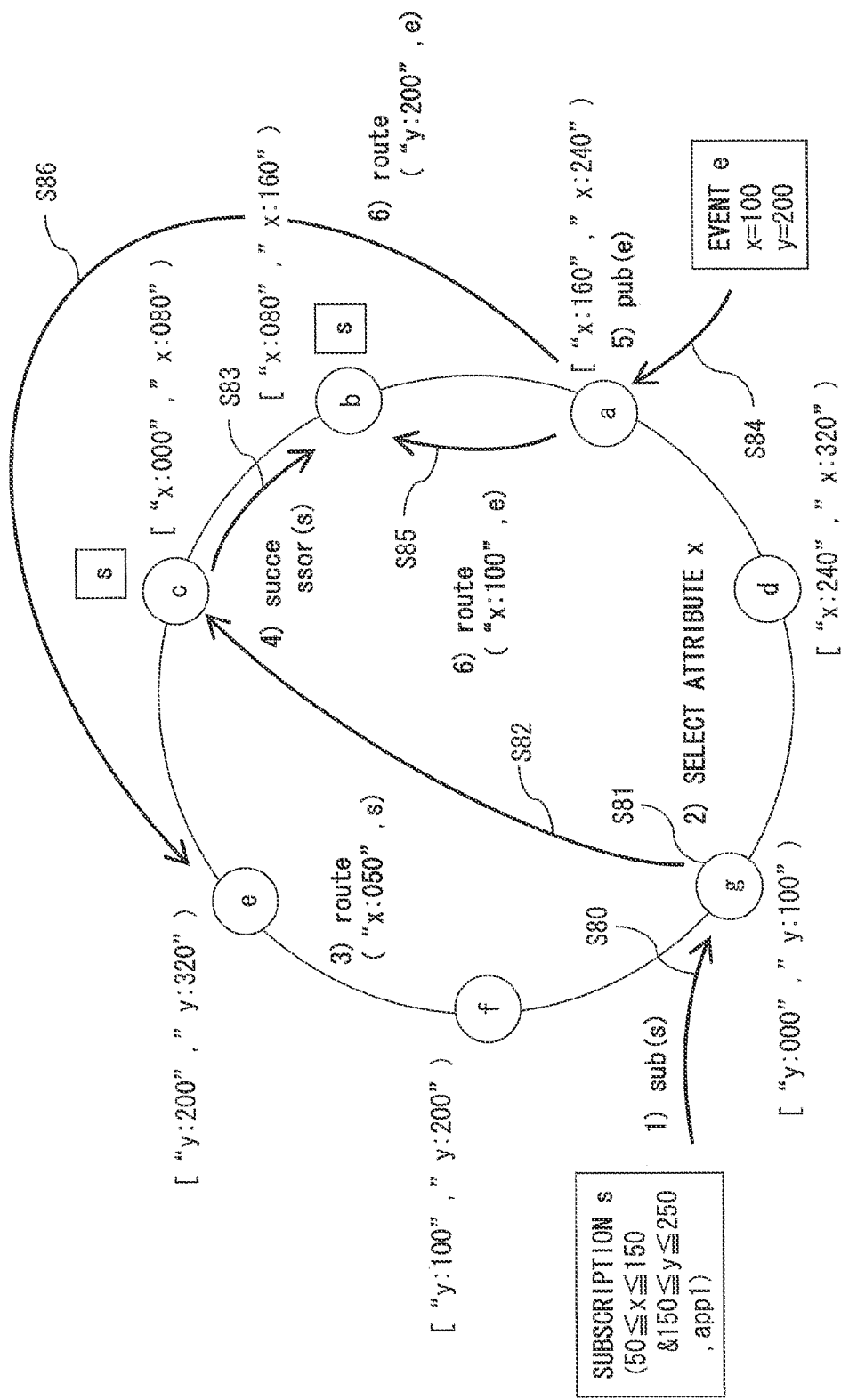
FIG. 18 shows an operation example of an event distribution system according to an exemplary embodiment of the present invention.
Figure 19:
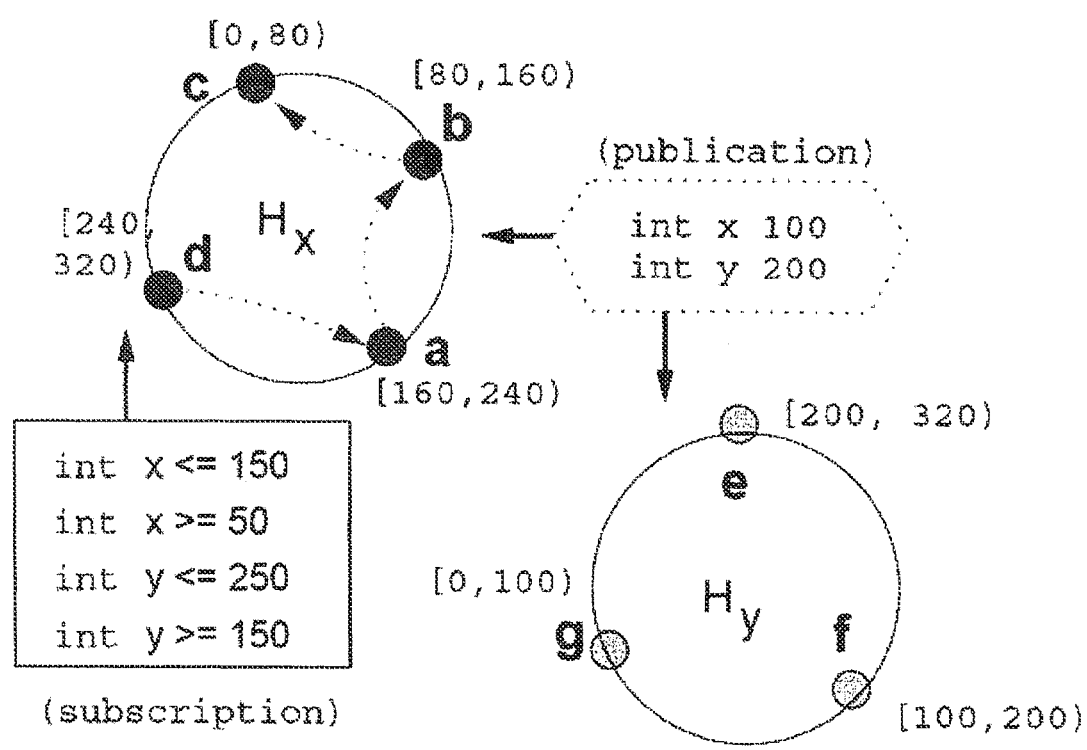
FIG. 19 is a diagram for explaining a related art.

Next, an operation in the event distribution system 1 according to this exemplary embodiment is explained with reference to FIG. 18. FIG. 18 shows an operation example of the event distribution system 1.

Assume that a node g, which is one of the components of the event distribution system 1, receives a subscription s (50≤x≤150 & 150≤y≤250, app1) from the subscriber 31 (S80).

The node g selects an attribute x from attributes x and y constituting the subscription s in the subscription transfer information generation unit 11 (S81). Next, the subscription transfer information generation unit 11 generates a key "x:050" from the attribute x and the minimum value "50" of the attribute value range of the attribute x. Note that the subscription transfer information generation unit 11 receives a subscription ID and a request type as well as the subscription from the subscriber 31. The subscription transfer information generation unit 11 generates a message by combining the selected attribute name "x" with the subscription ID, the subscription, and the request type. The subscription transfer information generation unit 11 supplies the key and the message to the message transfer unit 17. Then, the message transfer unit 17 transmits the received key and message to a node that manages the key according to the routing protocol.

The key and message transmitted from the message transfer unit 17 of the node g eventually arrive at the message transfer unit 17 of a node c that manages the key "x:050" through the message transfer unit 17 of zero or at least one node. That is, the key and message transmitted from the node g may arrive at the node c through nodes e and f, or may arrive at the node c directly from the node g. In this example, the key and the message arrive at the node c for which "(transmitted key)−(minimum value of key range managed by node)" is the lowest among nodes for which "(transmitted key)>(minimum value of key range managed by node)" is satisfied.

Since the received key "x:050" is within the key range ["x:000", "x:080") managed by the node c, the message transfer unit 17 supplies the key and the message to the message determination unit 13. Since the message is composed of a subscription, the message determination unit 13 supplies the key and the message to the subscription placement control unit 14. The subscription placement control unit 14 registers a pair of the subscription ID and the subscription in the subscription management unit 15. That is, this example shows a case where the request type is a registration request.

Further, a key "x:150" generated from the attribute name "x" contained in the message and the maximum value "150" of the attribute value range of the attribute name "x" is not within the key range ["x:000", "x:080") managed by the node c. Therefore, the subscription placement control unit 14 supplies the minimum value "x:080" of a key managed by the successor and the received message to the message transfer unit 17.

It should be noted that a node b that manages a key range ["x:080", "x:160") subsequent to the key range ["x:000", "x:080") managed by the node c is defined as the successor of the node c. That is, when the key "x:150" generated from the maximum value "150" of the attribute value range of the message is not within the node c, the attribute value range of the message is included in the node b that manages the key range subsequent to the key range managed by the node c. Therefore, the node c transmits a key "x:080" generated from the minimum value of the key range managed by the node b and the message to the node b so that the subscription of the message is also registered in the node b. Therefore, the node b, which is the successor, is designated as the next hop by the subscription placement control unit 14 to the message transfer unit 17. Then, the message transfer unit 17 transmits the received key and message to the node b.

The key and the message transmitted from the message transfer unit 17 of the node c arrive at the node b (S83). Since the received key "x:080" is within the key range ["x:080", "x:160") managed by the node b, the message transfer unit 17 of the node b supplies the key and the message to the message determination unit 13. Then, similarly to the process performed in the node c, the subscription and the subscription ID constituting the message are registered in the subscription management unit 15 of that node. Further, the key "x:150" generated from the attribute name "x" contained in the message and the maximum value "150" of the attribute value range of the attribute name "x" is within the key range ["x: 080", "x:160") managed by the node b. Therefore, the subscription placement control unit 14 does not supply the key and the message to the message transfer unit 17. Therefore, the message is not transferred. As a result of these processes, the subscription s is stored in both the node c and the node b.

Next, assume that a node a, which is one of the components of the event distribution system 1, receives an event e (x=100, y=200) from the publisher 32 (S84). Since the event is composed of an attribute name x and an attribute name y, the event transfer information generation unit 12 of the node a generates a key "x:100" for the attribute name x and a key "y:200" for the attribute name y. For each of the generated keys, the event transfer information generation unit 12 handles the event as a message and supplies the key and the message to the message transfer unit 17. Then, the message transfer unit 17 transmits the received keys and messages to nodes that manage the keys according to the routing protocol.

The messages are transferred to nodes that manage the respective keys. The key "x:100" and the message transmitted with that key arrive at a node b (S85). The key "x:200" and the message transmitted with that key arrive at a node e (S86).

When the key "x:100" and its event arrive at the node b, the message transfer unit 17 of the node b supplies the received key and the message to the message determination unit 13 because the key "x:100" is within the range ["x:080", "x:160") managed by the node b. Since the message is composed of an event, the message determination unit 13 supplies the key and the message to the event condition conformance determination unit 16. The event condition conformance determination unit 16 obtains a subscription management table from the subscription management unit 15. Then, since the event condition of the subscription s registered in the subscription management table is "(50≤x≤150) and (150≤y≤250)" and the attribute value of the event is "x=100, y=200", the event condition conformance determination unit 16 determines that the event conforms to the event condition. Therefore, the event condition conformance determination unit 16 notifies the event to an application appl.

Further, when the key "y:200" and its event arrive at the node e, the message transfer unit 17 of the node e supplies the received key and the message to the message determination unit 13 because the key "y:200" is within the range ["y:200", "y:320") managed by the node e. Since the message is composed of an event, the message determination unit 13 supplies the key and the message to the event condition conformance determination unit 16. The event condition conformance determination unit 16 obtains a subscription management table from the subscription management unit 15. Further, although the attribute value of the event is "x=100,y=200", the subscription s is not registered in the subscription management table. Therefore, the event condition conformance determination unit 16 determines that the event does not conform to the event condition. Therefore, the event condition conformance determination unit 16 does not notify the event to the application.

As explained above, in this exemplary embodiment, it is possible to determine whether or not an event is included in a key range managed by a node by using a key that is generated by converting an attribute name and an attribute value contained in the event into a format that enables a magnitude comparison of the attribute name and the attribute value. In other words, a node can determine whether an event is an event to be processed or not. Therefore, even when two or more nodes each of which has a different attribute name are included in the same hub, it is possible to determine whether or not an event or a subscription should be processed by the node by performing a simple comparison. That is, it is possible to include two or more nodes each of which manages a different attribute name in the same hub. Therefore, there is no need to prepare hubs corresponding to respective attribute names. In this way, when the load on each node is to be adjusted, the adjustment of the load can be made by just adjusting the range of an attribute value managed by each node. As a result, it is possible to facilitate the adjustment of the load imposed on each node.

Further, according to this exemplary embodiment, as described above, there is no need to prepare hubs corresponding to respective attribute names. Therefore, there is no need to determine a cross-hub adjacent node by performing random walk and the like. Therefore, it is possible to reduce the processing cost.

Further, the present invention is not limited to the above-described exemplary embodiments, and various modifications can be made without departing from the spirit and scope of the present invention described above.

This exemplary embodiment is configured in such a manner that a node always transmits a subscription or an event received from a subscriber or a publisher, and a key generated from the subscription or the event to other nodes. Then, a decision is made in other nodes based on the received key. However, the present invention is not limited to this configuration. For example, a node may transmit only a subscription or an event to other nodes. In this case, for example, a key may be generated from the received subscription or the event by the subscription transfer information generation unit or the event transfer information generation unit and a decision in made based on the generated key in other nodes.

The above-described node according to the present invention may be constructed by supplying a program that is used to implement functions of the above-described exemplary embodiment to a computer, and causing the computer, or a CPU, an MPU (Micro Processing Unit) or the like of the computer to execute this program.

Further, this program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Further, in addition to the cases where the functions of the above-described exemplary embodiment are implemented by causing a compute to execute a program that is used to implement functions of the above-described exemplary embodiment, other cases where the functions of the above-described exemplary embodiment are implemented under instructions of this program with the cooperation with the OS (Operating System) or application software running on the computer are also included in the exemplary embodiment of the present invention.

Further, other cases where all or part of the processes of this program are executed by a function enhancement board inserted into the computer or a function enhancement unit connected to the compute in order to implement the functions of the above-described exemplary embodiment are also included in the exemplary embodiment of the present invention.

This application is based upon and claims the benefit of priority from Japanese patent application No. 2009-279210, filed on Dec. 9, 2009, the disclosure of which is incorporated herein in its entirety by reference.

REFERENCE SIGNS LIST 1, 2 EVENT DISTRIBUTION SYSTEM
5 INFORMATION PROCESSING SYSTEM
10, 20, 50, 60 NODE
11 SUBSCRIPTION TRANSFER INFORMATION GENERATION UNIT
12 EVENT TRANSFER INFORMATION GENERATION UNIT
13 MESSAGE DETERMINATION UNIT
14 SUBSCRIPTION PLACEMENT CONTROL UNIT
15 SUBSCRIPTION MANAGEMENT UNIT
16 EVENT CONDITION CONFORMANCE DETERMINATION UNIT
17 MESSAGE TRANSFER UNIT
51 KEY INFORMATION GENERATION UNIT
52 PROCESS TARGET DETERMINATION UNIT
53 PROCESS TARGET INFORMATION STORAGE UNIT
54 INFORMATION TRANSFER UNIT

The invention claimed is:

1. An information processing system comprising:
a plurality of nodes configured to receive event information including an attribute name indicating arbitrary information and an attribute value indicating a value corresponding to the arbitrary information, and configured to process event information including a predetermined attribute name and an attribute value within a predetermined attribute value range,
wherein a node from the plurality of nodes comprises:
a key information generation unit configured to, when the event information is received, generates first key information, the first key information being a value obtained by connecting a value corresponding to the attribute name included in the event information and the attribute value included in the event information;
a target key storing unit configured to store target key information indicating a predetermined key information range in advance, the predetermined key information range being a range from a value obtained by connecting the value corresponding to the predetermined attribute name and a minimum attribute value within the predetermined attribute value range to a value obtained by connecting the value corresponding to the predetermined attribute name and a maximum attribute value within the predetermined attribute value range;
a target determination unit configured to, when the event information is received, determines that the event information is target event information if the first key information generated from the received event information is included in the key information range indicated by the target key information; and
an information transfer unit configured to, when the received event information is not the target event information, transmits the event information, or the event information and the first key information generated from the event information to another node.

2. The information processing system according to claim 1, wherein the node further comprises:
an event condition information storing unit configured to store event condition information indicating the attribute name and a range of the attribute value; and
an event condition matching unit configured to, when the received event information is the target event information, perform the process corresponding to the event information and the event condition information if the attribute name in the event condition information exists in the event information and the attribute value corresponding to the attribute name in the event information is in the range of the attribute value in the event condition information.

3. The information processing system according to claim 2, wherein when the event condition information is received from out of the information processing system, the key information generation unit generates second key information, the second key information being a value obtained by connecting a value corresponding to the attribute name described in the event condition information and the attribute value in the range of the attribute value corresponding to the attribute name, wherein the target determination unit determines that the event condition information is target event condition information if the second key information generated from the received event condition information is included in the key information range indicated by the target key information, and wherein, when the received event condition information is not the target event condition information, the information transfer unit transmits the event condition information, or the event condition information and the second key information generated from the event condition information to another node.

4. The information processing system according to claim 3, wherein the node further comprises:

an event condition information control unit configured to:
store the event condition information with identification information into the event condition information storing unit when the node receives the event condition information and information for requesting registration of the event condition information as request type, and when the received event condition information is the target event condition information, the identification information that uniquely identifies the event condition information, and deletes the identification information and the event condition information corresponding to the identification information stored in the event condition information storing unit when the node receives the identification information and information for requesting deletion of the event condition information as request type, and when the received event condition information is the target event condition information.

5. The information processing system according to claim 3, wherein the key information generation unit selects the attribute name from the attribute names described in the event condition information, which has the lowest ratio of the range of the attribute value corresponding to the attribute name to a possible range of attribute value among all ratios of the attribute names in the event condition information and generates the second key information from the selected attribute name and the range of the attribute value corresponding to the selected attribute name.

6. The information processing system according to claim 3, wherein the key information generation unit generates first or second key information when event information or event condition information is received from a generator of the event information or event condition information received from a generator of the event information or event condition information respectively, and wherein the information transfer unit transmits the event information and the first key information generated from the event information when the event information is transmitted, and transmits the event information and the second key information generated from the event condition information when the event condition information is transmitted.

7. The information processing system according to claim 1, wherein the plurality of nodes are included in a hub, and wherein the hub includes nodes, each of which processes the event information with the key information generated from different attribute name.

8. The information processing system according to claim 1, wherein the attribute name is defined to permit magnitude comparison, and wherein the key information generation unit generates the first key information so that k1>k2 when n1>n2 or n1=n2 and v1>v2, where n1 and n2 are arbitrary attribute names, v1 and v2 is any real number corresponding to n1 and n2 respectively, k1 is key information generated from n1 and v1 and k2 is key information generated from n2 and v2.

9. A control method that receives event information including an attribute name indicating arbitrary information and an attribute value indicating a value corresponding to the arbitrary information, and processes event information including an attribute name and a predetermined attribute value within a predetermined range, the control method comprising:

generating, when the event information is received, first key information, the first key information being a value obtained by connecting a value corresponding to the attribute name included in the event information and the attribute value included in the event information;

determining, when the event information is received, that the event information is target event information if the first key information generated from the received event information is included in a predetermined key information range, predetermined key information range, the predetermined key information range being a range from a value obtained by connecting the value corresponding to the predetermined attribute name and a minimum attribute value within the predetermined attribute value range to a value obtained by connecting the value corresponding to the predetermined attribute name and a maximum attribute value within the predetermined attribute value range; and transmitting, when it is determined that the received event information is not the target event information, the event information, or the event information and the first key information generated from the event information to another node.

10. A non-transitory computer readable medium storing a program for controlling a node that receives event information including an attribute name indicating arbitrary information and an attribute value indicating a value corresponding to the arbitrary information, and processes event information including an attribute name and a predetermined attribute value within a predetermined range, the program causing a computer to execute:

a step of, when the event information is received, generating first key information, the first key information being a value obtained by connecting a value corresponding to the attribute name included in the event information and the attribute value included in the event information:

a step of, when the event information is received, determining that the event information is target event information if the first key information generated from the received event information is included in predetermined key information range, the predetermined key information range being a range from a value obtained by connecting the value corresponding to the predetermined attribute name and a minimum attribute value within the predetermined attribute value range to a value obtained by connecting the value corresponding to the predetermined attribute name and a maximum attribute value within the predetermined attribute value range; and a step of, when it is determined that the received event information is not the target event information, transmitting the event information, or the event information and the first key information generated from the event information to another node.

* * * * *

UNITED STATES PATENT AND TRADEMARK OFFICE
CERTIFICATE OF CORRECTION

| | | |
|---|---|---|
| PATENT NO. | : 8,978,048 B2 | Page 1 of 1 |
| APPLICATION NO. | : 13/514444 | |
| DATED | : March 10, 2015 | |
| INVENTOR(S) | : Tadashi Sato | |

It is certified that error appears in the above-identified patent and that said Letters Patent is hereby corrected as shown below:

In the claims,

Column 16, Line 48: In Claim 1, delete "transmits" and insert -- transmit --

Column 16, Line 66: In Claim 3, delete "wherein" and insert -- wherein, --

Column 17, Line 56: In Claim 6, after "of the event" delete "information or event condition information received from a generator of the event"

Column 18, Line 55: In Claim 10, delete "information:" and insert -- information; --

Signed and Sealed this
Seventeenth Day of May, 2016

Michelle K. Lee
*Director of the United States Patent and Trademark Office*